Jan. 19, 1965        R. A. HAWLEY ETAL        3,166,007
FOOD MOLD COVER UNIT
Filed Nov. 12, 1963
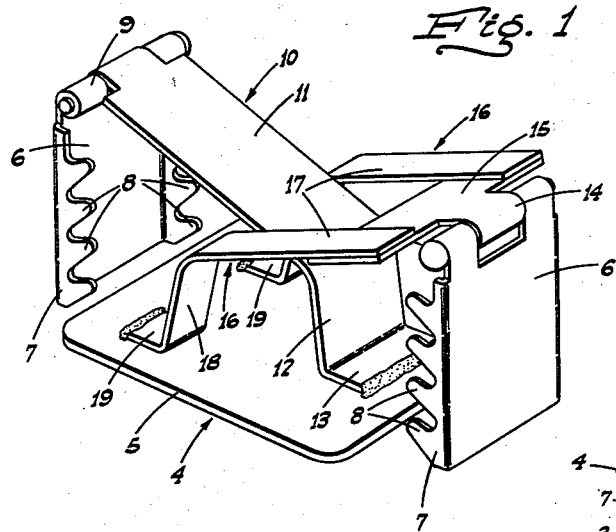
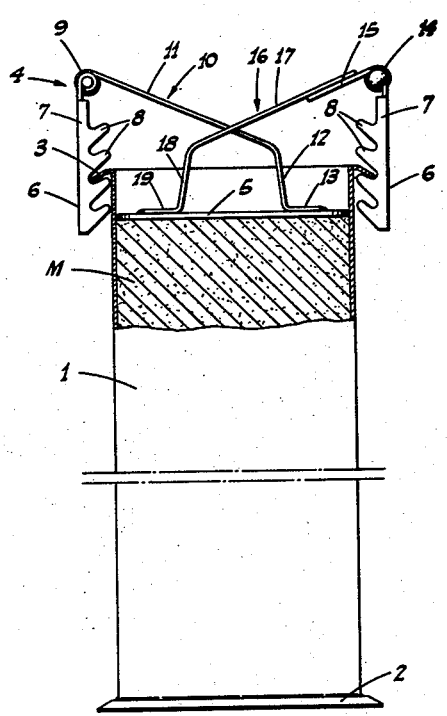
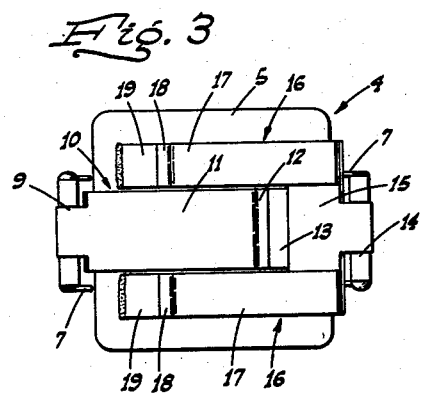
INVENTORS
Richard A. Hawley
Harold B. Hanson
BY Webster & Webster
ATTYS.

United States Patent Office 3,166,007
Patented Jan. 19, 1965

3,166,007
FOOD MOLD COVER UNIT
Richard A. Hawley, San Leandro, and Harold B. Hanson, Oakland, Calif., assignors to Meat Packers Equipment Co., Oakland, Calif., a California corporation
Filed Nov. 12, 1963, Ser. No. 322,885
2 Claims. (Cl. 100—219)

The present invention relates in general to a meat loaf mold and the cover unit therefor.

The mold is of the type which is normally closed at one end, and initially open at the other end for loading of the mold with a meat product; the cover unit being applied to said other end of the mold after the latter is loaded, and then serving to maintain a pressure on the meat product in the mold during the subsequent cooking or other processing operation.

The major object of the present invention is to provide a cover unit, for the purpose described, which includes a pressure plate adapted to enter the loaded mold in engagement with the meat product therein, catch means for releasable connection with the mold, and a novel spring assembly between the pressure plate and the catch means; such spring assembly being loaded upon such connection of the catch means, and then urging the pressure plate inwardly while holding the catch means against accidental release.

Another important object of the invention is to provide a food mold cover unit, as in the preceding paragraph, wherein said spring assembly is comprised of a plurality of leaf springs disposed in side-by-side but intersecting order which permits of the use of somewhat longer, and hence more effective, leaf springs then would otherwise be possible. Additionally, the leaf springs—as so arranged—are capable of relatively heavy loading while at the same time exerting a balanced force on the pressure plate.

A further object of the invention is to provide a food mold cover unit which is designed for ease and economy of manufacture, and convenience of use.

A still further object of the invention is to provide a practical, reliable, and durable food mold cover unit and one which is exceedingly effective for the purpose for which it is designed.

These objects are accomplished by means of such structure and relative arrangement of parts as will fully appear by a perusal of the following specification and claims.

In the drawings:

FIG. 1 is a perspective view of the improved cover unit, detached from the mold.

FIG. 2 is a side elevation of the cover unit on a reduced scale and shown as mounted on a loaded mold; the latter being partly broken out and in section.

FIG. 3 is a top plan view of the cover unit.

Referring now more particularly to the drawings and to the characters of reference marked thereon, the mold 1—to which the cover unit (as later described) is adapted to be removably attached—is elongated in an end-to-end direction and of generally square form in cross section. At one end the mold includes a fixed base member 2; such end of the mold normally being closed by a bottom plate (not shown). The other end of the mold is initially open and is provided with an outwardly projecting surrounding flange 3 having somewhat of a downward slope as shown in FIG. 2.

The cover unit, indicated generally at 4 and which cooperates with said open mold end and the flange 3, is constructed as follows:

Said cover unit comprises a flat closure and pressure plate 5 of a size and configuration to slidably fit within the mold 1. In order to releasably hold the pressure plate 5 in forceful contact with the meat product M in the loaded mold, the following arrangement is provided:

Depending from above and at opposite sides of the pressure plate 5 are substantially rectangular catch plates 6, each formed along its opposite side edges with transversely matching ratchet flanges 7. Such ratchet flanges 7 each comprise a plurality of upwardly inclined catch teeth 8 facing the mold and adapted to engage under the related mold flange 3.

Hingedly connected to one of the catch plates 6 at the top thereof, as at 9, is a leaf spring indicated generally at 10. The leaf spring 10 (which is narrower than pressure plate 5 and disposed centrally between the front and rear edges thereof) is formed with a straight portion 11 sloping downwardly from the hinge 9 toward the opposite side of said plate 5.

Such straight portion 11 terminates short of the pressure plate 5, and at its lower end said portion 11 is formed with a leg 12 which depends to said plate and is there provided with an outwardly extending foot 13 welded or otherwise rigidly secured to the upper face of such plate near said opposite side thereof.

The other catch plate 6 is hingedly connected at the top, as at 14, to a cross bar 15 which is considerably wider than said plate 6. The cross bar 15 spans between and is fixed to the upper ends of a pair of transversely spaced leaf springs 16; the spacing of the leaf springs 16 being such that they straddle the leaf spring 10 in adjacent, intersecting relation as shown in FIG. 3.

The leaf springs 16, while opposed to the leaf spring 10, are substantially identical in form, longitudinal extent and configuration. Thus, each such leaf spring 16 comprises a straight portion 17 projecting toward the opposite side of the pressure plate 5 with a downward slope, a depending leg 18 at the lower end of the straight portion 17, and a foot 19 on the lower end of the leg rigidly secured on the upper surface of the pressure plate 5.

The relationship of the leaf springs 10 and 16 to the pressure plate 5 and the catch plates 6 is such that when the springs are slack and the catch plates are disengaged from the mold flanges said catch plates are then held at a level above that of the pressure plate 5, as shown in FIG. 1.

In operation, after the closure and pressure plate 5 has been located in the mold in engagement with the meat product M therein, the leaf springs 10 and 16 are loaded by pressing down thereon, accompanied by corresponding engagement of the catch teeth 8 of the ratchet flanges 7 with the related portion of mold flange 3, as shown in FIG. 2. In this position of the parts, the plate 5 is maintained under constant pressure against the meat product M. Such pressure assures that—during the subsequent cooking or other processing operations—there will be no formation of undesirable voids or air pockets in the meat loaf. Thus, when the processing is complete, the meat loaf will be very uniform and compact in texture as is desirable.

The two leaf springs 16, while each of less width than the leaf spring 10 combine to exert the same downward pressure on the plate 5 as said leaf spring 10, when all of said springs are loaded by corresponding engagement of the catch plates 6 with the related portion of flange 3.

Further, it will be evident that the degree of pressure exerted by the pressure plate 5 on the meat product in the mold may be changed, to suit different conditions, by exerting greater or less depressing pressure on the leaf springs 10 and 16 when initially mounting the cover unit on the mold, so as to correspondingly alter the engaged position of the catch plates 6 relative to the mold flange 3.

From the foregoing description, it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A cover unit for the initially open end of a meat loaf mold comprising a pressure plate adapted to slidably fit in the open end of the mold, catch members disposed beyond opposite sides of the pressure plate and adapted for releasable connection with the mold, and springs between the catch members and pressure plate above the latter and functioning independently of each other to be placed under load and together to cause inward pressure on said plate to be exerted when the catch members are connected with the mold; said springs being leaf springs attached at their upper ends to the catch members and extending thence crosswise of the pressure plate in side-by-side opposed relation and sloping from the catch members toward the pressure plate in intersecting relation intermediate their ends; said springs including substantially vertical legs depending from their lower ends to the pressure plate, and flat feet projecting away from each other on the lower ends of the legs and secured on said pressure plate.

2. A cover unit for the initially open end of a meat loaf mold comprising a pressure plate adapted to slidably fit in the open end of the mold, catch members disposed beyond opposite sides of the pressure plate and adapted for releasable connection with the mold, and springs between the catch members and pressure plate above the latter and functioning independently of each other to be placed under load and together to cause inward pressure on said plate to be exerted when the catch members are connected with the mold; said springs including one leaf spring above the pressure plate and hinged at its upper end to the upper end of one catch member, said one leaf spring comprising an initially straight portion extending at a downward slope from said hinge toward the other side of the pressure plate, a leg depending from the lower end of said straight portion to the pressure plate relatively near said other side thereof, and means rigidly securing the leg at its lower end on the pressure plate; a pair of leaf springs of substantially the same longitudinal extent and configuration as said one leaf spring extending from the other catch member in opposed straddling relation to said one leaf spring to rigid connection with the pressure plate relatively close to the side thereof opposite that to which the leg of such one leaf spring is secured, a cross bar rigid with and connecting the upper ends of said pair of leaf springs clear of said one leaf spring, and a hinge connection between said cross bar and the upper end of said other catch member.

References Cited by the Examiner
UNITED STATES PATENTS

| | | | |
|---|---|---|---|
| 1,981,075 | 11/34 | Samuel | 99—351 |
| 2,192,225 | 3/40 | Gleason | 99—351 |
| 2,322,199 | 6/43 | Smith et al. | 99—351 |
| 2,793,028 | 5/57 | Wheeler. | |

WALTER A. SCHEEL, *Primary Examiner.*